US009843384B2

(12) United States Patent
Walma, Jr. et al.

(10) Patent No.: US 9,843,384 B2
(45) Date of Patent: *Dec. 12, 2017

(54) ARTIFICIAL LIGHT SOURCE BASED MESSAGING PLATFORM

(71) Applicant: Cooper Technologies Company, Houston, TX (US)

(72) Inventors: Kenneth Dale Walma, Jr., Peachtree City, GA (US); Brian Elwell, Tyrone, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,183

(22) Filed: Nov. 28, 2016

(65) Prior Publication Data

US 2017/0078018 A1 Mar. 16, 2017

Related U.S. Application Data

(63) Continuation of application No. 14/486,859, filed on Sep. 15, 2014, now Pat. No. 9,510,427.

(Continued)

(51) Int. Cl.
*H05B 37/02* (2006.01)
*H04B 10/11* (2013.01)
*H04B 10/40* (2013.01)
*H04B 10/116* (2013.01)
*H04B 10/50* (2013.01)
*H05B 33/08* (2006.01)

(52) U.S. Cl.
CPC .......... *H04B 10/11* (2013.01); *H04B 10/116* (2013.01); *H04B 10/40* (2013.01); *H04B 10/502* (2013.01); *H05B 33/0845* (2013.01); *H05B 37/0218* (2013.01); *H05B 37/0227* (2013.01); *H05B 37/0272* (2013.01); *H05B 33/0818* (2013.01)

(58) Field of Classification Search
CPC ............ H05B 37/0272; H05B 37/0227; H05B 37/0218
USPC .......................................... 315/149, 150, 308
See application file for complete search history.

(56) References Cited

U.S. PATENT DOCUMENTS

2006/0139185 A1 6/2006 Bonnat
2006/0294209 A1 12/2006 Rosenbloom
(Continued)

OTHER PUBLICATIONS

International Search Report dated Mar. 5, 2015 for PCT/US2014/055679.
EP Search Report for EP14843804 dated Feb. 24, 2017.

*Primary Examiner* — Thuy Vinh Tran
(74) *Attorney, Agent, or Firm* — King & Spalding LLP

(57) ABSTRACT

A processor receives data associated with a device. On the basis of the data associated with the device, the processor modulates a light from the artificial light source at a rate imperceptible to a human eye while detectable by a light sensor device. The modulated light is representative of the data associated with the device. The modulated light is detected, demodulated, and decoded by the light sensor device to retrieve the data associated with the device. Further, the data associated with the device is presented by the light sensor device to a user. In addition, the light sensor device is configured to receive input data from the user and communicate the input data to the processor via a wireless link. The processor is configured to receive the input data from the light sensor device and effect a change in a characteristic of the device based on the received input data.

20 Claims, 5 Drawing Sheets

Related U.S. Application Data

(60) Provisional application No. 61/877,547, filed on Sep. 13, 2013, provisional application No. 61/877,565, filed on Sep. 13, 2013.

(56) References Cited

U.S. PATENT DOCUMENTS

| | | |
|---|---|---|
| 2008/0203928 A1 | 8/2008 | Frumau |
| 2008/0315798 A1 | 12/2008 | Diederiks |
| 2009/0218951 A1 | 9/2009 | Weaver |
| 2010/0171442 A1 | 7/2010 | Draper |
| 2010/0322635 A1 | 12/2010 | Klinghult |
| 2010/0327766 A1 | 12/2010 | Recker |
| 2012/0153838 A1 | 6/2012 | Schenk |
| 2012/0200226 A1 | 8/2012 | Knibbe |
| 2013/0140995 A1 | 6/2013 | Jones |
| 2013/0214687 A1 | 8/2013 | Weaver |
| 2014/0028198 A1 | 1/2014 | Reed |
| 2014/0375217 A1 | 12/2014 | Feri |

ARTIFICIAL LIGHT SOURCE BASED MESSAGING PLATFORM

CROSS REFERENCE TO RELATED APPLICATIONS

This application is a continuation application of and claims priority under 35 U.S.C. §120 to U.S. patent application Ser. No. 14/486,859, titled "Artificial Light Source Based Messaging Platform," filed on Sep. 15, 2014, which claims priority under 35 U.S.C. §119 to U.S. Provisional Application No. 61/877,547, filed on Sep. 13, 2013, titled "Artificial Light Source Based Messaging Platform for Viewing Settings," and U.S. Provisional Application No. 61/877,565, filed on Sep. 13, 2013, titled "Artificial Light Source Based Messaging Platform with a Response Mechanism." The entire content of each of the foregoing patent applications is incorporated herein by reference.

TECHNICAL FIELD

This disclosure generally relates to a field of optical communication, and in particular relates to an artificial lighting source based messaging platform.

BACKGROUND

A system may have numerous devices that operate in concert to drive the system. For example, a lighting system for a building may comprise thousands of switches, occupancy sensors, light control panels, and/or light fixtures configured to hold artificial light sources, such as light bulbs or light emitting diodes (LEDs). In another example, a security system for a building may have numerous electronic locks, surveillance cameras, motion sensors, and so on. Further, each device in the system may have different default or programmed settings. Furthermore, in today's world, each of these devices may be digitally addressable to provide a more efficient method to control the settings of the devices.

Controlling an operation of the system may demand controlling a setting of one or more devices from the number of devices associated with the system. To control the settings of the one or more digital devices, initially a user may have to determine the settings of each of the devices of interest. However, to determine the settings of the one or more devices of interest, conventional technology may need a user to manually locate each of the specific devices of interest, and manually determine the digital address associated with the device of interest. Further, the user may have to determine where information regarding the setting of the located device of interest is stored, and access the information from the location using the digital address. Alternatively, conventional technology may need a user to access spreadsheets or databases that store the locations to manually locate the one or more devices and view its settings. Thus, accessing information associated with a device in a system using conventional technology may be cumbersome, time consuming, and prone to errors. Further, as the number of devices in the system increases, accessing information associated with a specific device using conventional technology may become increasingly unwieldy.

In addition, once the settings associated with the one or more devices are determined, conventional technology may lead a user to access a control system to change a setting of the one or more devices. The control system may be coupled to the one or more devices over a network backbone or over the Internet. Further, the user has to have specific knowledge of the functioning of the control system to change the settings associated with the one or more devices. Alternatively, conventional technology provides a graphical user interface (GUI) that is incorporated into each device that needs to be controlled. Such installations may drive up the cost of the devices and may be impractical. In view of the foregoing, there is a need for a technology that overcomes the above-mentioned limitations.

SUMMARY

The present disclosure can address the above-described needs using an artificial light source based messaging platform. The artificial light source based messaging platform can be used to view data associated with a device as well as control one or more characteristics of the device, such as settings of the device.

In one aspect, a method includes a processor receiving data associated with a device. Upon receiving the data associated with the device, the method includes modulating, using the processor, an artificial light source associated with the processor based on the data. The processor is coupled to the device. The modulation results in generating modulated light via the artificial light source, wherein the modulated light is detectable by a light sensor device and representative of the data associated with the device. Then, the method includes receiving, by the processor, data from the light sensor device over a wireless communication link. On the basis of the data from the light sensor device, the method includes effecting, by the processor, a change in a characteristic of the device.

In another aspect, a method includes receiving, by a processor, data associated with a device. Then, the method includes modulating, by the processor, an artificial light source associated with a transceiver unit coupled to the device based on the data. Further, the method includes generating, by the processor, a modulated light via the artificial light source. The modulated light is generated resultant to the modulation of the artificial light source and is representative of the data associated with the device. In addition, the modulated light is detectable by a light sensor device.

In yet another aspect, a method includes detecting, by a sensor device, a modulated light from an artificial light source. The modulated light is representative of data associated with a device coupled to the artificial light source. Upon detecting the modulated light, the method includes demodulating, by the sensor device, the modulated light. Further, the method includes decoding, by the sensor device, the demodulated light to retrieve data associated with the device. In addition, the method includes presenting, by the sensor device, the data associated with the device.

In another aspect, a transceiver unit includes an artificial light source configured to emit light. The transceiver also includes a communication circuit configured to receive data associated with a device. Further, the transceiver unit includes a memory configured to store data associated with the device. In addition, the transceiver unit includes a processor coupled to the memory and the artificial light source. The processor can control the artificial light source based on the data associated with the device to generate a modulated light, and the modulated light is representative of the data associated with the device.

In yet another aspect, a transceiver unit includes a memory configured to store data associated with a device. The transceiver unit also includes a processor coupled to the memory and an artificial light source. The processor is configured to control the artificial light source based on the data associated with the device to generate a modulated light. The modulated light is representative of the data associated with the device.

These and other aspects, features, and embodiments of the present invention may be more clearly understood and appreciated from a review of the following detailed description of the disclosed embodiments and by reference to the drawings and claims.

BRIEF DESCRIPTION OF THE FIGURES

Example embodiments are illustrated by way of example and not limitation in the figures of accompanying drawings, in which.

Figure 1:
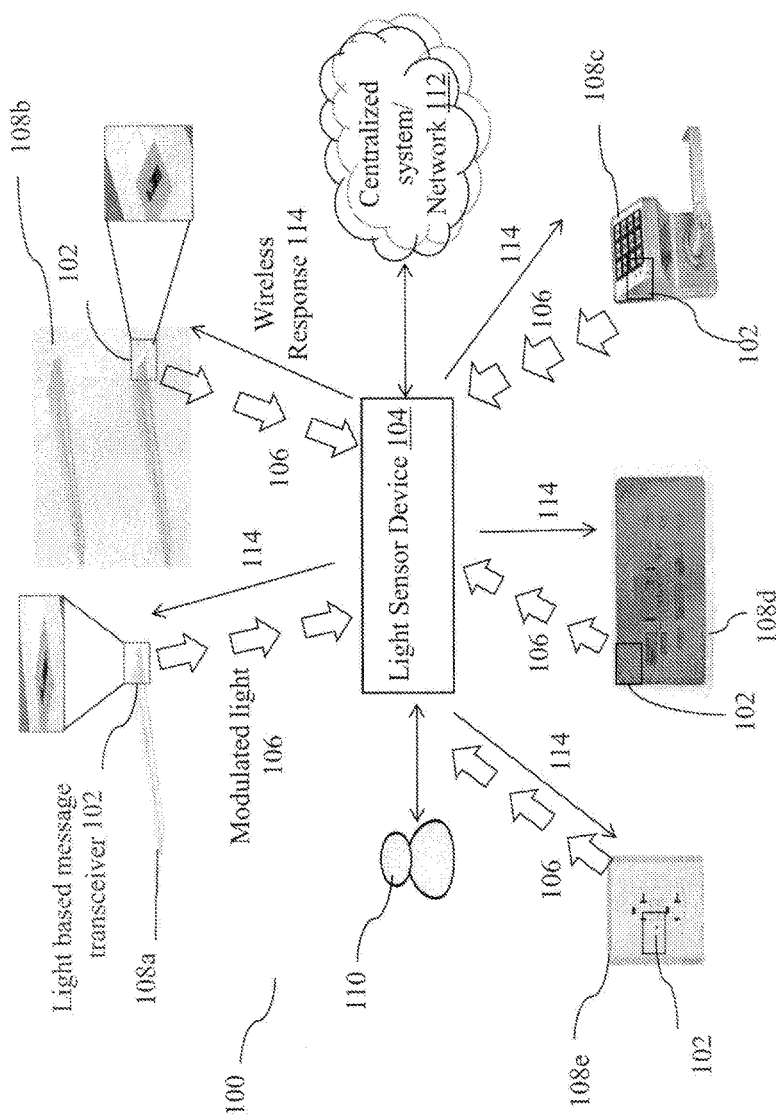
FIG. 1 illustrates an example operational environment of the artificial light source based messaging platform, according to certain example embodiments of the present disclosure.

Many aspects of the invention can be better understood with reference to the above drawings. The elements and features shown in the drawings are not to scale, emphasis instead being placed upon clearly illustrating the principles of example embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DETAILED DESCRIPTION

Disclosed are a system, a method and an apparatus for artificial light source based messaging. In the following description, for purposes of explanation, numerous specific details are set forth in order to provide a thorough understanding of the various embodiments.

It will be appreciated that the various embodiments discussed herein need not necessarily belong to the same group of example embodiments, and may be grouped into various other embodiments not explicitly disclosed herein. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense. Before discussing the embodiments directed to the method, system, and apparatus for artificial light source based messaging, it may assist the reader to understand the various terms used herein by way of a general description of the terms in the following paragraphs.

The term 'device' as described herein may generally include any appropriate digital device, electronic device, analog device, electrical device, networking device, security device, home appliance, and or other appropriate device. Listing a few examples of the device, without being exhaustive, the device may be a coffee machine, a light control panel, light fixtures, electrical lamps, a switchboard, a thermostat, a telephone, an electric/AC (alternating current) receptacle, an electronic lock, a keypad, a modem, a server, etc. In another example, the device may include mechanical devices that are adapted to include artificial light sources.

The term 'artificial light source' as described herein may generally refer to any appropriate man-made source of light. For example, an artificial light source may include, inter alia, electric lamps, incandescent lamps, light emitting diodes, gas discharge lamps, and high intensity discharge lamps. In the following description, even though a light emitting diode may be used as an example representation of the artificial light source, one of ordinary skill in the art can understand and appreciate that the light emitting diode may be replaced by other appropriate artificial light sources without departing from the broader scope of this description.

The term 'data associated with the device' as described herein may generally refer to any appropriate information associated with a device. The data associated with the device may include, inter alia, a digital address of the device, an electric, electronic, and/or mechanical setting of the device, a list of components that form the device, settings associated with the components of the device, maintenance and service information associated with the device, configuration of the device, a status of the device, or any appropriate operational information associated with the device, etc. The artificial light source may be configured to emit modulated light based on the data associated with the device.

The 'light sensor device' as described herein may generally refer to any appropriate digital device adapted to detect light or adapted to include a sensor that is capable of detecting light. For example, the light sensing device may include a mobile computing device such as a smart phone or a hand held device embedded with a light sensor. In another example, the light sensing device may include a wearable computing device or a body-borne computing device, such as Google glass which is a wearable computing device with a head mounted optical display. In another example, the light sensing device as a wearable computing device could be a watch with a digital display and adapted to detect the modulated light. In one embodiment, the light sensing device may include a display interface to visually display data to a user. In another embodiment, the light sensing device may be configured to transmit the data to an external display device. In yet another embodiment, the light sensing device may be configured to communicate data to the user through other means, such as auditory, tactile, and/or olfactory.

An artificial light source based messaging platform may include a light based message transceiver unit (herein 'transceiver unit'). The transceiver unit may be adapted to be attached to or embedded in any appropriate device. The transceiver unit may include an artificial light source, wherein the artificial light source is adapted such that light emitted by the artificial light source may be modulated at a frequency that is imperceptible to the human eye, but detectable by a light sensor device. In other words, the light emitted from the artificial light source may flicker, but the rate (frequency) at which the light flickers may be imperceptible to the human eye, but detectable by a light sensor device. The modulated light may be generated by controlling the artificial light source. Further, the modulated light generated from the artificial light source may be representative of any appropriate data associated with the device to which the transceiver unit is attached to or within which the transceiver unit is embedded.

The modulation of the artificial light may be based on data that is to be conveyed. For example, if the data to be conveyed is 010 in binary, then the artificial light source may be controlled to initially emit light at a first frequency representative of the first 0, followed by emitting light at a second frequency representative of a 1, which is further followed by emitting light at the first frequency representative of the last 0.

As described above, the modulated light may be detectable by a light sensor device. The light sensor device may include a light sensor, such as a photo diode that is adapted to detect the modulated light from the artificial light source. In one example, the light sensor device may be adapted to specifically detect the modulated light and distinguish between the modulated light, light that is not modulated, flickering light from a light source due to an error in the light source circuitry, and/or light from natural light sources. In the following description, even though a photo diode is used as an example light sensor for detecting the modulated light, one of ordinary skill in the art can understand and appreciate that the photo diode may be replaced by any other appropriate light sensors without departing from the broader scope of this description.

Upon detecting the modulated light from the artificial light source, the light sensor device may demodulate the modulated light and decode the data associated with the device that is transmitted through the modulated light. Further, the light sensor device may be configured to display the data associated with the device to a user over the display interface of the light sensor device. In one embodiment, when the data associated with the device is a digital address of the device, the light sensor device may be configured to transmit the data to a centralized database or a centralized system over a wired and/or wireless network to retrieve additional data associated with the device which may be customized to the user.

Once the data associated with the device is displayed to a user, the user may decide to change the settings of a device. The user may input the changes via a graphical user interface (GUI) associated with the light sensor device, such as a smart phone, smart watch, wearable computing devices, etc. The inputted changes, i.e., the new setting values may be transmitted to the transceiver unit coupled to the device.

The transceiver unit may include a communication circuit that is configured to receive data transmitted from the light sensor device over a wireless or wired communication link. The wireless communication link can include, inter alia, a Wi-Fi link, a WiMax link, a cellular link, Zigbee link, Bluetooth link, or any other appropriate wireless link. Further, the communication circuit may be configured to transfer the received data to a processor that is configured to change the settings of the device based on the new setting values received from the light sensor device.

Figure 3:
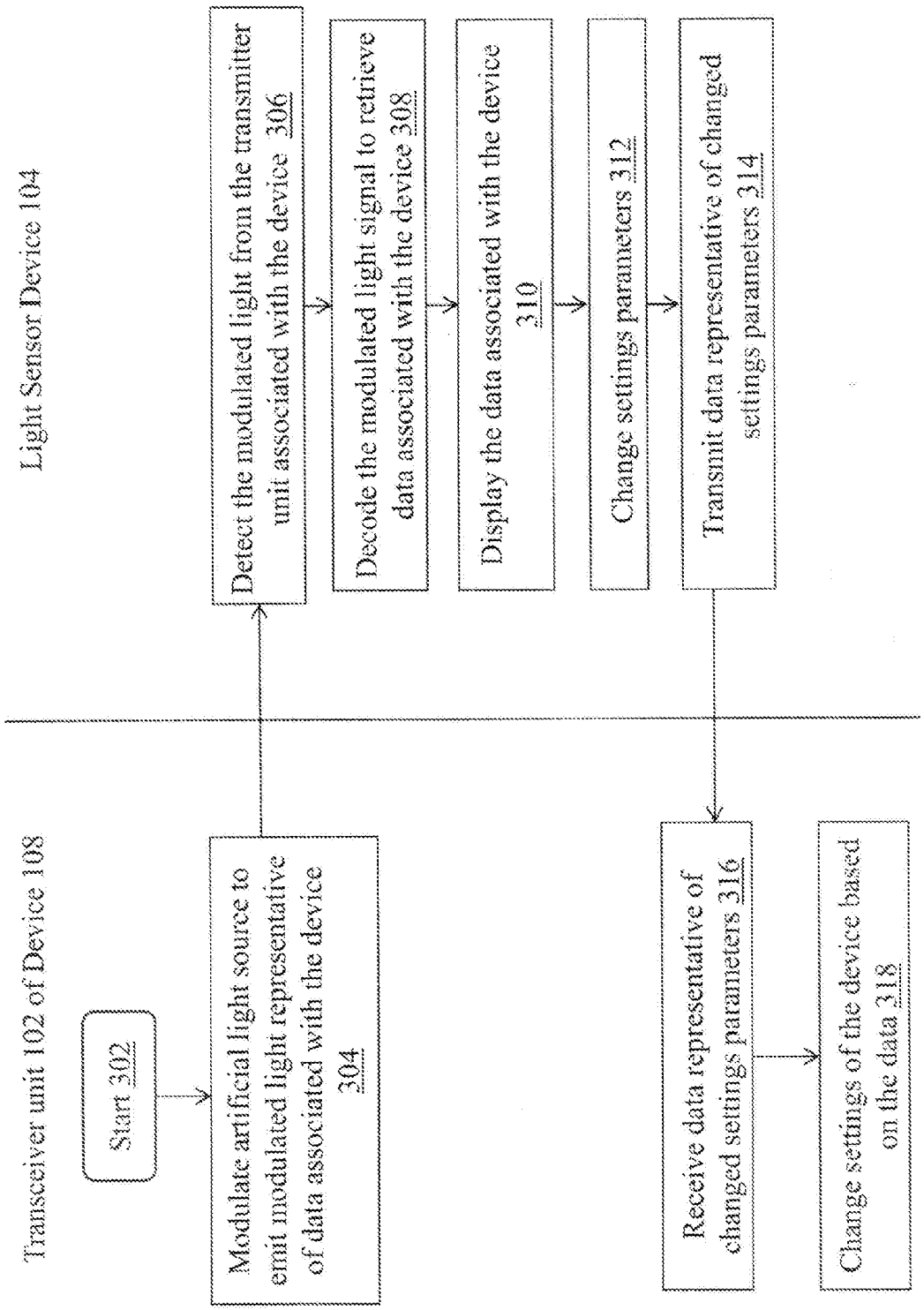
FIG. 3 illustrates process flow diagrams of one or more methods of communicating data associated with a device using the artificial light source based messaging platform, according to certain example embodiments of the present disclosure.
Figure 4A:
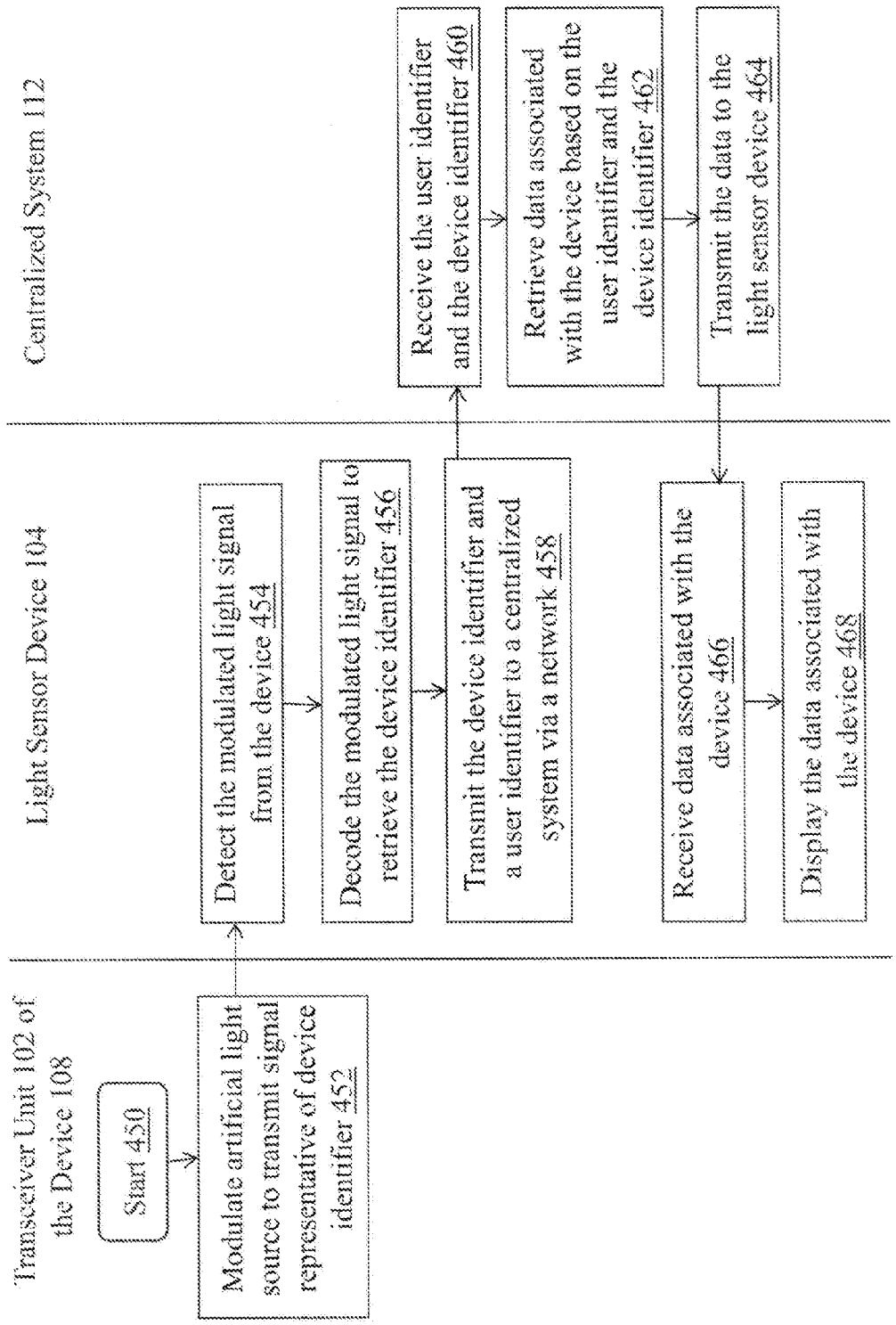
FIGS. 4A and 4B (collectively 'FIG. 4') illustrate a process flow diagram of another method of communicating data with a device using the artificial light source based messaging platform, according to certain example embodiments of the present disclosure.
Figure 4B:
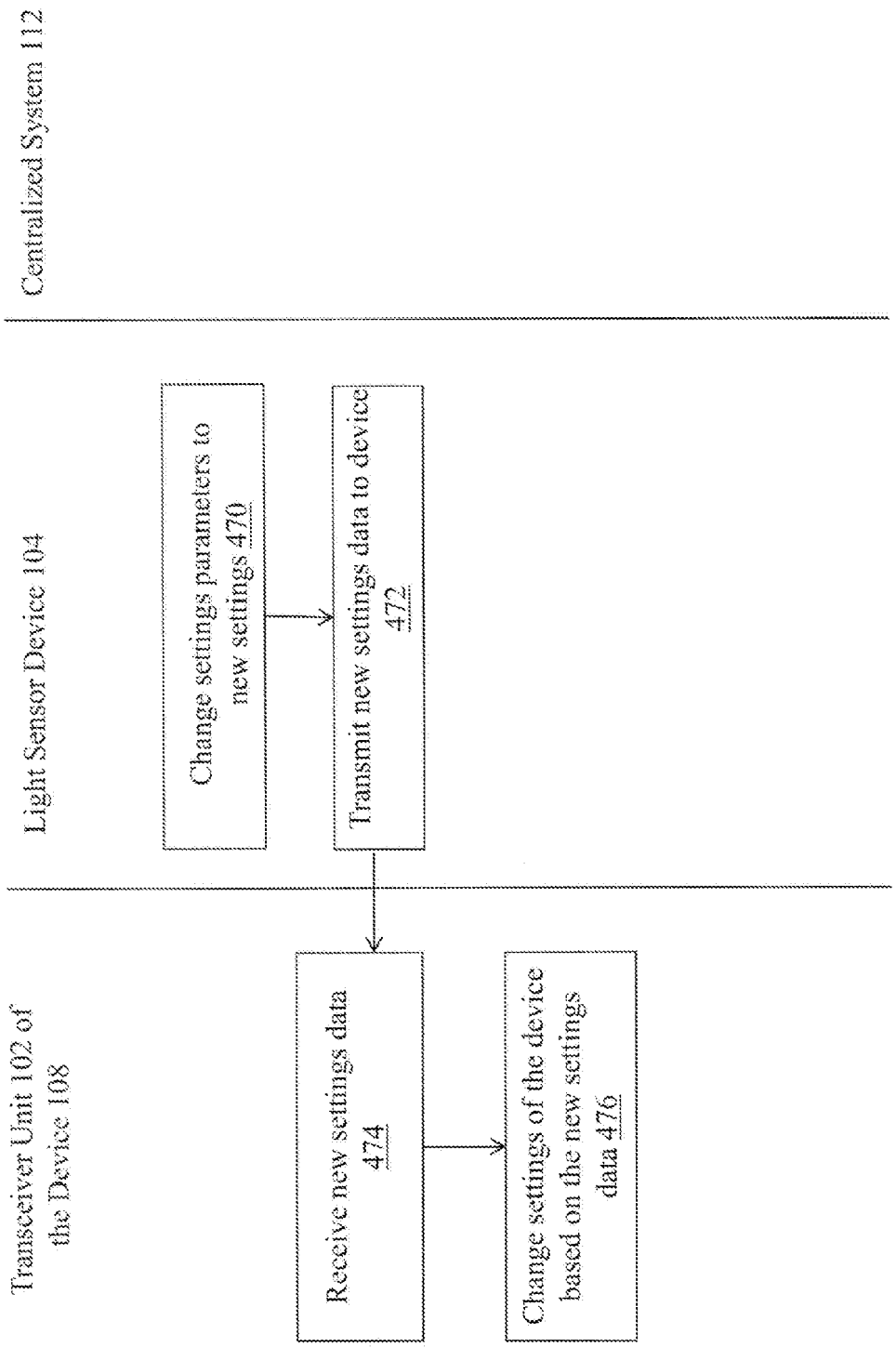

Technology for artificial light source based messaging will now be described in greater detail with reference to FIGS. 1-4B which describe representative embodiments of the present invention. In the following description, for purposes of explanation, numerous specific details are set forth in order to provide a thorough understanding of the various embodiments. FIG. 1 describes an operational environment of an artificial light source based messaging platform. FIG. 2 describes the light based message transmitter in greater detail. FIGS. 3-4B will be described by making references back to FIGS. 1-2. Specifically FIGS. 3, 4A and 4B describe the different operations of the artificial light source based messaging platform using suitable illustrations and flowcharts.

As described above, the present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "example embodiments" given herein are intended to be non-limiting and among others supported by representations of the present invention.

Now turning to FIG. 1, FIG. 1 illustrates an example operational environment of the artificial light source based messaging platform, according to certain example embodiments of the present disclosure. In particular, FIG. 1 illustrates one or more devices 108a-e, light based message transceivers 102, a light sensor device 104, modulated light 106, a wireless response 114, and a user associated with the light sensor device 110. The following description may refer to a device 108, which may be representative of one or more devices 108a-e.

In one embodiment, a device 108 may include a transceiver unit 102. In one embodiment, the transceiver unit 102 may be built into the device. In another embodiment, the transceiver unit 102 may be attachable to the device 108. Further, in one embodiment, the transceiver unit 102 may be associated with one device 108. In another embodiment, the transceiver unit 102 may be associated with more than one of the devices 108a-e, i.e., one transceiver unit 102 may represent a group of devices.

The transceiver unit 102 may be configured to transmit data associated with the device by modulating light emitted from an artificial light source. In other words, the modulated light 106 may be representative of data associated with the device 108. In one embodiment, the data associated with the device may include device settings data (herein 'settings data') associated with the device 108. The settings data associated with the device 108 can include, inter alia, the mechanical settings, electrical settings, power settings, temperature settings, meter readings, and/or any appropriate settings.

For example, for an electric lamp device, the settings can include, inter alia, the circuit number associated with the lighting fixture adapted to hold the electric lamp, the voltage reading on the electric lamp, the power reading in watts associated with the electric lamp, light intensity of the light emitted by the electric lamp, service information including the date at which the lighting fixture was serviced, and/or date when the electric lamp was fitted. In another example, for a thermostat device, the settings reading can include, inter alia, a current temperature reading associated with a heating/cooling device, a pre-set minimum and maximum temperature, last date on which the thermostat and/or associated heating/cooling device was serviced, power reading associated with the thermostat, the name of the service technician that serviced the thermostat, components of the thermostat and/or the associated heating/cooling device that may need to be replaced in the near future, model number of the thermostat, and/or an estimated date of the next required servicing.

In yet another example, for an electric lamp device within a large lighting system, the settings data can include, inter alia, a device identifier such as a circuit number and/or a panel number, a group identifier associated with a group of electric lamps to which the electric lamp of interest is associated. In another example, for an electric receptacle device, the settings data can include, inter alia, a voltage and current rating associated with the electric receptacle, and/or information indicating if each socket and/or contact in the socket is energized. In a further example, for a coffee maker device, the settings data can include, inter alia, a temperature reading of the coffee, a voltage, current, and/or power reading associated with the coffee maker, and/or a brew time. In another example, for an electronic lock device, the settings data can include information regarding the state of the lock, a make of the lock, a model of the lock, an access granted information, an access denied information, and/or an access code associated with the lock.

In another embodiment, the data associated with the device 108 can include device identifier data (herein 'digital address') of the device 108 which can be used to obtain additional data, such as settings data associated with the device 108 as will be described below in greater detail. One of ordinary skill in the art can understand and appreciate that a digital address is an example representation of the device identifier data, and the digital address can be replaced by any other appropriate data that identifies a device 108 without departing from the broader scope of the description. In another embodiment, the data associated with the device 108 can include both the settings data and the digital address or just settings data. In an example embodiment, the transceiver unit 102 may choose between the settings data and the digital address based on the size of data, power constraints, and/or other additional factors that affect the speed of transmission, the power associated with the transceiver unit, etc. For example, if the size of settings data associated with a device is below a data size threshold such as 1 MB, then the transceiver unit may choose to transmit the settings data. On the other hand, if the size of the setting data is greater than 1 MB, then the transceiver unit may choose to transmit the digital address which can then be used to obtain additional data associated with the device. In another example, if the transceiver unit is configured to conserve power, then the transceiver unit may decide to transmit the digital address of the device for each transmission instead of transmitting large amounts of data through light modulation.

The modulated light 106 representative of data associated with the device 108 may be detected by the light sensor device 104. The light sensor device 104 may be coupled to a centralized system through a private network or a public network, such as a VPN or the Internet over a wired and/or wireless communication link. In one embodiment, the light sensor device 104 may be adapted to include a sensor capable of detecting the modulated light 106, such as a photo diode. Upon detecting the modulated light 106, the light sensor device 104 may be configured to demodulate and decode the modulated light 106 to extract the data transmitted via the modulated light 106. Further, the light sensor data 104 may determine if the data is settings data, a digital address, and/or any other appropriate data associated with the device.

If the extracted data is settings data, then the light sensor device 104 may be configured to display the data to a user 110 associated with the light sensor device 104. In one embodiment, the data may be displayed through a display interface associated with the light sensor device 104. In another embodiment, the light sensor device 104 may communicate the data to a user 110 over an external or remote display unit. In yet another embodiment, the light sensor device 104 may communicate the data to a user 110 via other communication means, such as auditory, tactile, etc.

If the extracted data is a digital address associated with the device 108, the light sensor device 104 may be configured to communicate the digital address to a centralized database, and/or a cloud server (herein 'a centralized system') via a wired and/or wireless link. Further, in addition to the digital address, the light sensor device 104 may transmit a user profile or a user identifier associated with a user 110 to the centralized system. Upon receiving the digital address and/or the user profile, the centralized system may retrieve additional data associated with the device 108, for example settings data. Further, based on the user profile, the centralized system may filter the additional data and customize the additional data based on requirements and privileges allotted to a user 110. Then, the centralized server may transmit the additional data to the light sensor device 104 via a wired and/or wireless communication link. Further, the light sensor device 104 may communicate the received additional data, such as the settings data with a user 110 via one or more presentation means, such as visual, auditory, and/or tactile means.

Upon communicating the data associated with a device 108 to the user, the user may decide to change the data or input new settings data to change the settings of the device 108. In one embodiment, new settings data or any other appropriate light control related data may be input to the light sensor device 104 through an input interface embedded in or associated with the light sensor device 104. For example, data may be input through a touchscreen module of the light sensor device or through a keypad of the light sensor device. In another example, the input interface can be an audio interface or a gesture recognition interface. That is a user can provide voice commands as input or perform a gesture that is captured and decoded as an input. In yet another example, a remote input device may be coupled to the light sensor device and a user may access the remote input device to provide input such as new settings data to the light sensor device 104. The light sensor device 104 may receive the new settings data and communicate the new settings data to the transceiver unit 102 over a wired and/or wireless link. When data is transmitted from the light sensor device 104 to the transceiver unit 102 over a wireless link, the data may be referred to as a 'wireless response' 114.

In one embodiment, the data transmitted by the light sensor device 104 may be received by the transceiver unit 102. Further, based on the received data, the transceiver unit 102 may change the settings of the device 108. In another embodiment, the received data may be transmitted to a processor of the device 108 that is external to the transceiver unit 102, which in turn may change the settings of the device 108. Once the settings have been changed, the transceiver unit 102 may further control the artificial light source to emit modulated light representative of the new settings which may be detected, decoded, and displayed by the light sensor device 104.

Figure 2A:
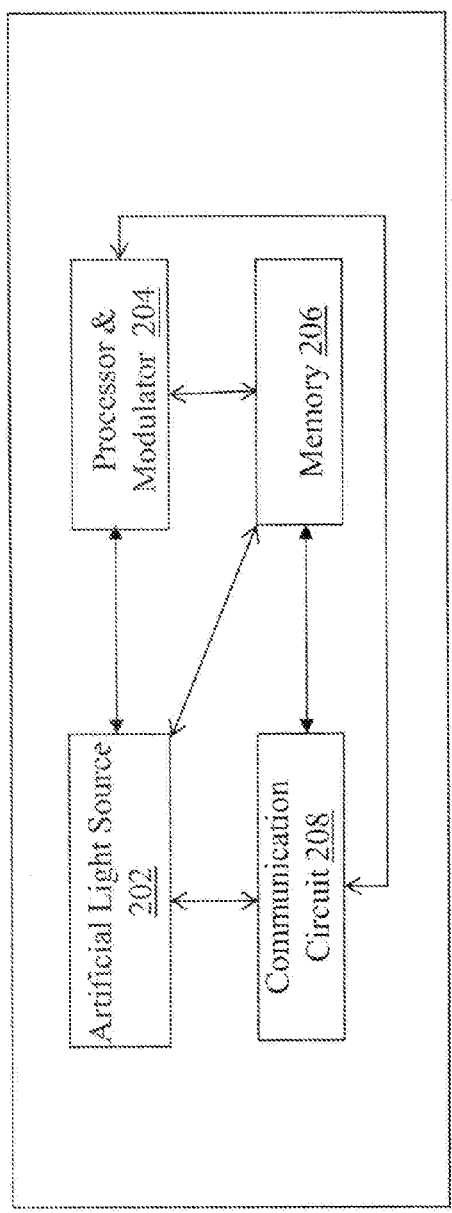
FIGS. 2A and 2B (collectively 'FIG. 2') illustrate block diagrams of a light based message transceiver unit, according to certain example embodiments of the present disclosure.
Figure 2B:
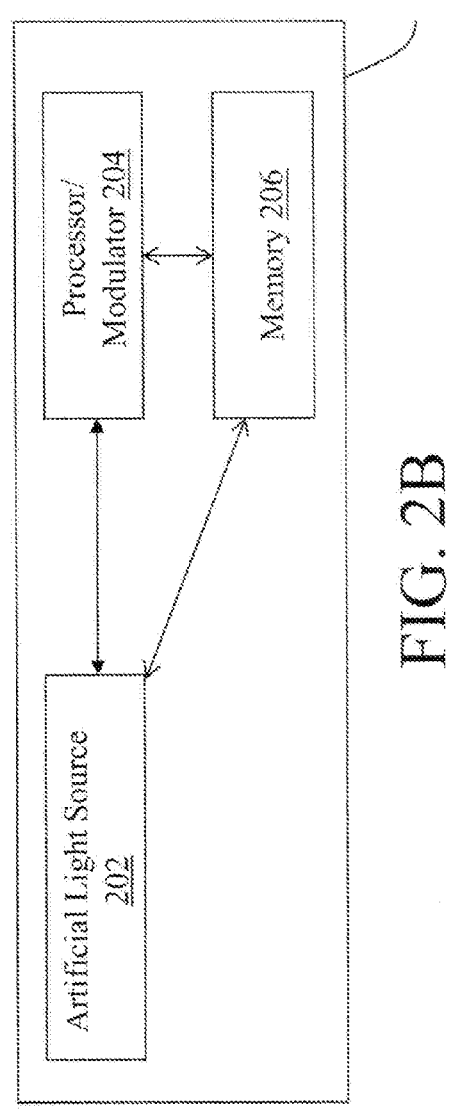

Turning to FIG. 2, FIGS. 2A and 2B (collectively FIG. 2) illustrate block diagrams of the light based message transceiver unit, according to certain example embodiments of the present disclosure. In particular, FIG. 2 illustrates an artificial light source 202, a processor and modulator unit 204, a communication circuit 208, and a memory 206.

As illustrated in FIG. 2A, the transceiver unit 102 can include processor and modulator unit 204. In one embodiment, the processor can be a multi-core processor. In another embodiment, the processor can be a combination of multiple single core processors. In one embodiment, the transceiver unit 102 can include a memory 206 coupled to the processor and modulator unit 204. The memory 206 can be a non-transitory storage medium, in one embodiment. In another embodiment, the memory 206 can be a transitory storage medium. The memory 206 can include instructions associated with the operation of the transceiver unit, which may be executed by the processor to perform operations of the transceiver unit 102. In other words, operations associated with modulation of the light emitted from the artificial light source 202 and communications to and from the transceiver unit 102 can be executed using the processor.

In another embodiment, the processor and memory may be external to the transceiver unit 102. The processor may be part of the device 108 that is associated with the transceiver unit 102. In said embodiment, the transceiver unit 102 may include a modulator and a communication circuit 208 that is configured to receive instructions from the external processor, wherein the instructions may control operations of the modulator which in turn may control the artificial light source 202 to modulate an emitted light.

In yet another embodiment as illustrated in FIG. 2B, the transceiver unit 102 may not include a communication circuit 208. In said embodiment, the memory 206 of the transceiver unit 102 may be configured to store instructions and other appropriate information to operate the transceiver unit 102 as a self-contained unit. For example, the memory may include the digital address of the device 108 associated with the transceiver unit 102. Further, the memory may include settings data for a number of different settings associated with the device 108.

In one embodiment, the transceiver unit 102 may be self-powered using batteries. In another embodiment, the transceiver unit 102 may be coupled to a power supply source that provides power to the device 108 associated with the transceiver unit 102.

In some embodiments, the transceiver unit 102 may be limited to the processor and modulator unit 204 and a memory 206. In said embodiment, the artificial light source may be a part of the device 108. For example, the artificial light source may be one or more LEDs embedded in the device 108 that may be used for a power or status indication of the device. In said example, the LED may be coupled to the transceiver unit 102 and may be adapted to receive signals from the transceiver unit 102 for emitting a modulated light 106.

In an example embodiment, in addition to emitting the modulated light representative of data associated with a device 108, the artificial light source 202 may be used for other operations such as illumination of a surrounding space. In another example, instead of using an artificial light source 202 associated with the transceiver unit 102, an electric lamp associated with the lighting fixture 108a may be used both for illumination and data transmission by modulating light from the electric lamp. In another example embodiment, the artificial light source 202 may be used specifically for transmitting data associated with the device via emitting modulated light.

In one embodiment, the light from the artificial light source may be modulated by controlling the electric signals inputted to the artificial light source that drive the artificial light source. In another embodiment, the light from the artificial light source may be modulated by switching the artificial light source on and off at a desired frequency. In yet another embodiment, the light from the artificial light source may be modulated by changing the intensity of light emitted from the artificial light source at a desired frequency. In other words, modulating an artificial light source may refer to modulating the light from the artificial light source by adjusting, inter alia, a frequency, a wavelength, and/or an intensity of the light from the artificial light source. In some embodiments, the modulation may be perceptible to the human eye. In other embodiments, the modulation may be imperceptible to the human eye.

In one embodiment, as illustrated in FIG. 2A, the communication circuit 102 may be configured to receive data of a device 108 (e.g., settings data or digital address) associated with the transceiver unit 102. Each time the settings of the device 108 are changed, the communication circuit 208 may receive the updated settings data. In an example embodiment, the settings data may be stored in the memory 206. Further, the digital address of the device may be stored in the memory 206. Depending on the size of the memory 206, the older settings data may be transferred to a larger external memory such as memory associated with the device 108 for future reference and the latest settings data may be stored in the memory 206. In some embodiments, the older settings data may be transmitted to a cloud server via the communication circuit 208 to be stored in the cloud server for future use. In another embodiment, if the memory 206 has a large data store capacity, then both the older settings data and the updated settings data may be stored in the memory 206.

Further, the communication circuit 208 may be configured to receive external trigger signals that trigger the processor to initiate the modulation of the light emitted by the artificial light source 202. In one embodiment, the external trigger signal may be received from the light sensor device 104 based on a corresponding action of a user 110. For example, the user 110 may press a button on the light sensor device 104 requesting the device 108 to provide its setting data or digital address. In another embodiment, the external trigger signal may be received from the device 108 associated with the transceiver unit 102. For example, the device 108 may instruct the transceiver unit 102 to broadcast data associated with the device 108. In yet another embodiment, the external trigger signal may be received from the device corresponding to an action of the user 110. For example, the user 110 may switch on the device 108, which automatically sends a trigger signal to the transceiver unit 102.

Furthermore, the communication circuit 208 may be configured to receive user input data from the light sensor device 104 preferably over a wireless link. The user input data may include new settings data to change the settings of the device 108.

In one embodiment, the transceiver unit 102 may be configured to broadcast data associated with the device 108 at regular intervals via the modulated light 106 from the artificial light source 202 even without any external trigger signals. In another embodiment, the transceiver unit 102 may be configured to broadcast data associated with the device 108 at intervals that are settable by a user.

In either case, upon receiving the trigger signal, the processor and the modulator unit 204 may operate to modulate the light emitted by the artificial light source 202 based on the data associated with the device 108. The operation of the transceiver unit 102 may be described below in greater detail, in association with FIG. 3.

Although specific operations are disclosed in the flowcharts illustrated in FIG. 3, such operations are examples only. That is, embodiments of the present invention are well suited to performing various other operations or variations of the operations recited in the flowcharts. It is appreciated that the operations in the flowcharts illustrated in FIG. 3 may be performed in an order different than presented, and that not all of the operations in the flowcharts may be performed.

All, or a portion of, the embodiments described by the flowcharts illustrated in FIG. 3 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described below.

Turning to FIG. 3, this figure illustrates process flow diagrams of one or more methods of communicating data associated with a device using the artificial light source based messaging platform, according to certain example embodiments of the present disclosure.

The process begins at operation 302 and proceeds to operation 304. In operation 304, the transceiver unit 102 associated with the device 108 may modulate the light emitting from an artificial light source 202 associated with the transceiver unit 102. The artificial light source 202 may be modulated based on the data associated with the device 108 that is to be communicated to a user 110. Further, the artificial light source 202 may emit a modulated light 106 which may be detected by a light sensor device 104 in operation 306.

Upon detecting the modulated light, in operation 308, the light sensor device 104 may be configured to demodulate and decode the modulated light to retrieve data associated with the device 108. Further, in operation 310, the light sensor device 104 may display the decoded data associated with the device 108 to a user 110 over a display interface. In some embodiments, the decoded data associated with the device 108 may include instructions to communicate at least a portion of the data with a centralized system to retrieve additional data associated with the device. As described above in association with FIG. 1, the light sensor device 104 may communicate with the centralized system over a wired or wireless network. In one embodiment, the communication between the light sensor device 104 and the centralized system may be secure and encrypted.

In addition to a portion of the data, the light sensor device 104 may communicate a location of the light sensor device 104 which is in a visible range of the device 108 and the transceiver unit 102. The location may be obtained based on a location estimation unit, such as a GPS unit associated with the light sensor device 104. In some embodiments, based on the location of the light sensor device 104, the centralized system may determine the device 108 for which the additional data is being requested. Further, the additional data may be transmitted to the light sensor device 104, which in turn may display the additional data to the user 110 via a display interface associated with the light sensor device 104.

Upon displaying the data associated with the device to the user, in operation 312, the user may express interest to change the present settings of the device 108 by inputting new parameter values for one or more device settings. In an example embodiment, the user may input the new parameter values (e.g., via a graphical user interface) to the light sensor device, such as a smart phone. Further, in operation 314, the new parameter values may be transmitted to the transceiver unit 102 preferably over a wireless link. In operation 316, the communication circuit 208 of the transceiver unit 102 may receive the new parameter values for the device settings and in response, in operation 318 change the settings associated with the device 108. Alternatively, the transceiver unit 102 may send the received new parameter values to a processor associated with the device 108 which may realize a change in settings of the device 108. In yet another embodiment, the light sensor device 104 may communicate the new parameter values back to the centralized system that may be in communication with a control system associated with the device 108 to induce a change in the settings based on the new parameter values.

In an example embodiment, the light sensor device 104 may be a wearable computing device, for example a head mounted optical display. The head mounted display may be adapted to visually display data to a user in a field of vision of the user. Further, in said example embodiment, the head mounted optical display may include a photo diode adapted to detect modulated light 106 from a transceiver unit 102. In the example embodiment, when the user donning the head mounted optical display unit looks at a light fixture 108b or when the head mounted display is in a line of sight of the light fixture 108b, the head mounted optical display unit may detect a modulated light 106 from a transceiver unit 102 associated with the light fixture 108b. Nearly simultaneously, the head mounted optical display unit may display settings data associated with the light fixture 108b. For example, the head mounted optical display may display a circuit identifier, a panel number, a voltage and current reading on the light fixture, a light intensity of the light fixture 108b if the electric lamp associated with the light fixture 108b is switched on, an operational status of the light fixture 108b, or a model of the light fixture 108b. Further, one or more light fixtures associated with light fixture 108b, or a group of light fixtures that are associated with each other may appear as color coded, wherein the color of the group of lights associated with each other may be different from the color associated with light fixtures that are not part of the group. This helps in easy identification of a group of devices associated with each other by visual means. Further, this helps in easy reading of device settings by just looking at the device using a wearable computing device such as a head mounted optical display unit. In another example, the wearable computing unit may be pointed at the device and the unit may pick up modulated light from the corresponding transceiver unit 102 and display data associated with the device on the wearable computing unit. Upon receiving the settings data such as light intensity associated with the light fixture 108b, a user may desire to reduce the light intensity or dim the light fixture 108b. The wearable computing device may either have a graphical display unit configured to display and/or receive control inputs (e.g., touchscreen) from the user or the wearable computing device may be communicatively coupled to a smart phone that has a graphical display unit configured to display and/or receive control inputs (e.g., touchscreen) from the user. The user may use the graphical display unit to input new settings, i.e., reduce the light intensity which may be communicated back to transceiver unit 102 via a wireless communication method, and the communication circuit 208 of the transceiver unit 102 may receive the new parameters and effect the necessary changes to the light intensity of the light fixture 108b.

The communication circuit 208 of the transceiver unit 102 may be a communications receiver unit. In some embodiments, operations 312 to 318 can be omitted, in which case the transceiver unit 102 can be replaced with a transmitter unit 102 capable of modulating the light associated with the artificial light source 202 and absent the receiving capabilities for receiving data from the light sensor device 104.

Turning to FIGS. 4A and 4B, the process flow begins with operation 450 and proceeds to operation 452. In operation 452, the transceiver unit 102 associated with the device 108 may modulate the light emitting from an artificial light source 202 coupled to the transceiver unit 102. The artificial light source 202 may be modulated based on the data associated with the device 108 that is to be communicated to a user 110. The data may include a digital address of the device 108. Further, the artificial light source 202 may emit a modulated light 106 which may be detected by a light sensor device 104 in operation 454.

Upon detecting the modulated light, in operation 456, the light sensor device 104 may be configured to demodulate and decode the modulated light to retrieve the digital address associated with the device 108. In some embodiments, the light sensor device 104 may be configured to determine whether the data is settings data, a digital address, a combination of both, or another appropriate data. If the data includes settings data, the light sensor device 104 may be configured to display the settings data to a user 110 via a display interface of the light sensor device 104 as described above in association with FIG. 3. If the data is a digital address, then in operation 458 the light sensor device 104 may be configured to transmit the digital address to a centralized system 112. In addition to the digital address, the light sensor device 104 may transmit a user identifier to the centralized system. The user identifier may reference a user 110, and further identify the user's profile, user's preference, and other user information stored in the centralized system.

In operation 460, the centralized system may receive the digital address and/or the user identifier. Upon receiving the digital address and/or user identifier, in operation 462, the centralized system may retrieve settings data and/or other additional data associated with the device 108. Further, based on the user identifier, the centralized system may filter and customize the settings data and/or additional data before transmitting data to the light sensor device 104 for display. In other words, the data may be customized based on the type of user and the privileges available to the user. For example, in the case of a light fixture, an end user may receive settings information such as voltage and current readings, and the intensity of the light associated with an electric lamp of the light fixture. However, the model and manufacture number, and last date on which the light fixture was serviced may be masked from the end user. For a technician, none of the data may be masked. The technician may be provided with all the available data. In another example, for an electronic lock unit, based on the end user, if the end user is authenticated, an access code may be transmitted to the light sensor device which in turn may be communicated to the end user for unlocking the electronic lock unit. On the other hand, a technician may be provided the lock model, the internal components of the lock, and other additional data needed to service or fix the electronic lock unit.

Once the settings data and/or additional data is filtered and customized, in operation 464, the customized data may be transmitted to the light sensor device. In operation 466, the light sensor device 104 receives the customized data and displays the customized data to a user 110 via a display interface in operation 468. Once the data is displayed to the user 110, operations 470-476 may be executed. Operations 470-476 may be similar to operations 312-318 of FIG. 3 and may not be repeated again. In some embodiments, the process may end with operation 468, and operation 470-476 may be omitted without departing from a broader scope of this disclosure.

In one example embodiment, user John Doe may don a head mounted optical display which may include a photo diode capable of detecting a modulated light from an artificial light source 202. The head mounted optical display including the photo diode may be a light sensor device. Further, John Doe may have a smart phone that is adapted to sense a modulated light from an artificial light source 202. John Doe may be a technician assigned to fix a light fixture 108a in a room that is locked using an electronic lock 108c that keeps the room locked. The electronic lock 108c may have an LED or artificial light source coupled to the electronic lock 108c or embedded in the electronic lock 108c. Both the light fixture 108a and the electronic lock 108c may be adapted to include the transceiver unit 102.

John Doe may walk up to the room and look at the electronic lock 108c. In one embodiment, the transceiver unit 102 of the electronic lock 108c may be automatically broadcasting a device identifier associated with the electronic lock 108c. In another embodiment, the electronic lock 108c may be fitted with a button which when pushed initiates a transmission of the device identifier 102. The transceiver unit 102 may transmit or broadcast the device identifier through modulated light from an artificial light source. The device identifier data may be embedded in the modulated light. In other words, the light from an artificial light source 202 associated with the transceiver unit 102 and coupled to or embedded in the electronic lock 108c may be modulated based on the device identifier data.

If the transceiver unit 102 is emitting modulated light representative of the device identifier, the head mounted optical display 104 and/or the smart phone 104 that is in a line of light of the transceiver unit 102 may detect the modulated light. Further, the head mounted display and/or the smart phone may demodulate and decode the modulated light to extract the device identifier associated with the electronic lock 108c. Further, either of the light sensor device 104, i.e., the head mounted display and/or the smart phone may add John Doe's user identifier to the device identifier and transmit both the identifiers to a centralized system 112. The centralized system 112 may authenticate John Doe and retrieve an access code associated with the electronic lock. Further, the access code may be transmitted back to either of the light sensor devices. If the access code is transmitted to a head mounted display, the access code may be visually presented to the user through the head mounted display. Alternately or in addition, the access code may be visually presented on the smart phone. Further, John Doe may use the access code to unlock the door and enter the room.

Once John Doe enters the room, John Doe may switch off the smart phone. The room may have three light fixtures of which one is light fixture 108a. John Doe may look at a first light fixture in the room through the head mounted optical display. The first light fixture that John Doe looks at may not include a transceiver unit and therefore no information may be displayed on the head mounted display. Then John Doe looks at a second light fixture in the room which is coupled to a transceiver unit 102. The head mounted display may detect modulated light from the second light fixture which may be demodulated, and decoded to extract data associated with the second light fixture. Further, the data associated with the second light fixture may be displayed to John Doe through the head mounted display. Based on the displayed data, John Doe may determine that the second light fixture is light fixture Y which may not of interest to John Doe. The data associated with the second light fixture may not be filtered or customized to John Doe's requirement.

John Doe proceeds to look at the third light fixture that is coupled to a corresponding transceiver unit 102. Data associated with the third light fixture may be received in the form of modulated light from the transceiver unit 102 associated with the third light fixture. The data may include a device identifier of the third light fixture. Further, the head mounted display may transmit either directly or through other communication means the device identifier along with John Doe's user identifier to the centralized system. The centralized system may retrieve the settings data associated with the third light fixture and filter the settings data based on John Doe's user identifier. The centralized system may recognize John Doe as an assigned technician and the data may include settings values that may be beneficial for a technician. Further, the filtered and customized data may be transmitted to the head mounted display which in turn may display the data to John Doe. The displayed data may indicate that the third light fixture is light fixture 108a and further the data may indicate that the electric lamp associated with the light fixture 108a needs to be replaced.

In addition the data may indicate that the light fixture is set to emit light at half intensity. After replacing the electric lamp or prior to replacing the electric lamp, John Doe may change the settings of the light fixture to emit light at full intensity by inputting the settings change through the head mounted display. The head mounted display may be configured to read hand gestures and recognize a user input corresponding to hand gestures or voice inputs. The head mounted display may recognize John Doe's intent to increase the intensity of light emission to full bright. Accordingly, the head mounted display may transmit the user input from John Doe to the transceiver unit 102 over a wireless link, provided the head mounted display has wireless communication capability. Nearly simultaneously, the intensity of light of the replaced electric lamp at the third light fixture may be changed to 100% bright.

Once the settings of the light fixture 108a are changed, the transceiver unit 102 associated with the light fixture 108a may cause the artificial light source 202 of the transceiver unit 102 to modulate light based on the new settings data. Further, the head mounted display may detect the modulated light and display the corresponding new data that indicates the new setting to John Doe.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the example embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A system comprising:
   a light sensor device; and
   a device communicably coupled to the light sensor device via a wireless communication link and comprising:
     an artificial light source; and
     a processor that is configured to:
       receive first data associated with the device;
       modulate the artificial light source based on the first data associated with the device, wherein responsive to the modulation, the artificial light source generates and emits a modulated light that is detectable by the light sensor device and that is representative of the first data associated with the device;
       in response to emitting the modulated light, receive second data from the light sensor device over the wireless communication link; and
       effect a change in a non-modulation related setting of the device based on the second data from the light sensor device.

2. The system of claim 1, wherein the modulated light from the artificial light source is modulated at a rate that is imperceptible to a human eye.

3. The system of claim 1, wherein the first data associated with the device is setting data.

4. The system of claim 1, wherein the first data associated with the device is a digital address of the device.

5. The system of claim 1, wherein effecting the change in the non-modulation related setting of the device comprises changing the non-modulation related setting associated with the device from a present setting to a new setting.

6. The system of claim 1, wherein effecting the change in the non-modulation related setting of the device comprises changing the non-modulation related setting associated with the device from a default setting to a new setting.

7. The system of claim 1, wherein the modulated light from the artificial light source is demodulated and decoded by the light sensor device to retrieve the first data associated with the device.

8. The system of claim 7, wherein the light sensor device is configured to present at least a portion of the first data associated with the device based on a user profile associated with the light sensor device.

9. An apparatus comprising:
   an artificial light source;
   a communication circuit; and
   a processor that is coupled to the artificial light source and the communication circuit, wherein the processor is configured to:
     receive first data associated with the apparatus;
     modulate the artificial light source based on the first data, wherein responsive to the modulation, the artificial light source generates and emits a modulated light that is detectable by a light sensor device, and wherein the modulated light is representative of the first data associated with the apparatus;
     in response to emitting the modulated light, receive, using the communication circuit, second data over the communication circuit; and effect a change in a non-modulation related setting of the apparatus based on the second data over the wireless communication circuit.

10. The apparatus of claim 9, wherein the modulated light from the artificial light source is modulated at a rate that is imperceptible to a human eye.

11. The apparatus of claim 9, wherein the first data associated with the apparatus is setting data.

12. The apparatus of claim 9, wherein the first data associated with the apparatus is a digital address of the apparatus.

13. The apparatus of claim 9, wherein effecting the change in the non-modulation related setting of the apparatus comprises changing the non-modulation related setting associated with the apparatus from a present setting to a new setting.

14. The apparatus of claim 9, wherein effecting the change in the non-modulation related setting of the apparatus comprises changing the non-modulation related setting associated with the apparatus from a default setting to a new setting.

15. A method comprising:
  detecting, by a sensor device, a modulated light from an artificial light source coupled to a device, wherein the modulated light is representative of data associated with the device coupled to the artificial light source;
  demodulating, by the sensor device, the modulated light;
  decoding, by the sensor device, the demodulated light to retrieve the data associated with the device;
  retrieving, by the sensor device from a server, additional data associated with the device;
  presenting, by the sensor device, the data associated with the device; and
  transmitting, by the sensor device, the additional data and a user input to the device, wherein the user input is received via a graphical user interface of the sensor device, and wherein the device is configured to change a setting of the device based on the user input and the additional data.

16. The method of claim 15, wherein the data associated with the device is a digital address of the device.

17. The method of claim 15, wherein the data associated with the device is data associated with the setting.

18. The method of claim 15, wherein the additional data is retrieved using a user identifier.

19. The method of claim 15, wherein the device is a light fixture and the setting is a brightness of light emitted by the light fixture.

20. The method of claim 15, wherein the device is an electronic lock and the setting is a user identifier.

* * * * *